United States Patent [19]

Bender

[11] Patent Number: 5,594,099
[45] Date of Patent: Jan. 14, 1997

[54] MODIFIED RESINATES

[75] Inventor: Albert Bender, Mainz, Germany

[73] Assignee: Hoechst Aktiengesellschaft, Germany

[21] Appl. No.: 414,501

[22] Filed: Mar. 31, 1995

[30] Foreign Application Priority Data

Apr. 29, 1994 [DE] Germany .......................... 44 15 084.9

[51] Int. Cl.$^6$ ....................................... C09F 1/02
[52] U.S. Cl. ......................... 530/218; 530/210; 530/214; 530/226; 530/227; 525/54.42; 525/54.44; 127/600; 156/30 R
[58] Field of Search ..................................... 530/210, 214, 530/218, 226, 227; 106/30; 525/54.42, 54.44; 527/600

[56] References Cited

U.S. PATENT DOCUMENTS

| | | |
|---|---|---|
| 3,674,732 | 7/1972 | Pitzalis et al. . |
| 3,880,788 | 4/1975 | Rudolphy ............................... 106/218 |
| 4,115,910 | 9/1978 | Rudolphy . |
| 4,198,329 | 4/1980 | Rudolphy . |
| 4,528,036 | 7/1985 | Rudolphy ................................ 106/30 |
| 4,552,592 | 11/1985 | Rudolphy et al. ........................ 106/30 |

FOREIGN PATENT DOCUMENTS

| | | |
|---|---|---|
| 1965403 | 10/1970 | Germany . |
| 2556183 | 6/1977 | Germany . |
| 2755825 | 6/1979 | Germany . |

*Primary Examiner*—James J. Seidleck
*Assistant Examiner*—Duc Trong
*Attorney, Agent, or Firm*—Bierman & Muserlian

[57] ABSTRACT

A modified resinate prepared by reacting

A) rosins or rosin acids with
B) aldehyde components and optionally
C) α,β-olefinically unsaturated carboxylic acids or anhydrides thereof, subsequently reacting the resultant adduction products with
D) phenols and optionally
E) alcohols containing at least two hydroxyl groups and subsequently forming resinates with
F) basic compounds of divalent metals, useful as resin binders of high viscosity in low solid printing inks for intaglio printing of illustrations.

7 Claims, No Drawings

MODIFIED RESINATES

STATE OF THE ART

The magnesium, calcium or zinc salts of rosin acids, which may also be modified, are known as resinates or rosinates. Resinates are used in toluene solution as binder resins for intaglio printing of illustrations. They have very good wetting behavior, particularly with respect to yellow pigments of the diazo type. Such resinates are disclosed in DE-C 2,755,825, which describes calcium resinates of products of the reaction of formaldehyde with rosin acids. However, these products are of low molecular weight and have a relatively low viscosity in toluene solution. To achieve good printing results at the printing viscosity used in practice, inks formulated with these resinates must have a relatively high-resin composition, entailing high costs for their production.

It is also known that the resinates described in the prior art give, with red pigments of the ®Litholrubin type in toluene, inks having poor properties which, in spite of their high resin content, have an unsatisfactory shelf life.

OBJECTS OF THE INVENTION

It is an object of the invention to provide novel resinates which allow the formulation of low-resin inks of high gloss which dry rapidly and have good printing properties for intaglio printing with toluene and can advantageously be employed both in yellow and in red colors.

This and other objects and advantages of the invention will become obvious from the following detailed description.

THE INVENTION

The modified resinates of the invention are prepared by reacting

A) rosins or rosin acids with

B) aldehyde components and optionally,

C) α,β-olefinically unsaturated carboxylic acids or anhydrides thereof, subsequently reacting the resultant adduction products with D) phenols and optionally E) alcohols containing at least two hydroxyl groups and subsequently forming resinates with F) basic compounds of divalent metals.

Component A) comprises rosins or rosin acids, preferably colophony, wood rosin, tall oil rosin and disproportionated or partially hydrogenated or dimerized rosin of any desired origin. The aldehyde components B), which can be in the form of free aldehydes or acetals, are preferably aliphatic $(C_1-C_7)$-aldehydes, particularly formaldehyde in various monomeric, oligomeric and polymeric forms, acetaldehyde, butyraldehyde or isobutyraldehyde, as well as benzaldehyde, furfural or glyoxal.

Suitable α,β-olefinically unsaturated compounds C) are preferably fumaric acid, maleic acid, itaconic acid, cinnamic acid, acrylic acid, methacrylic acid and particularly maleic anhydride.

The phenols D) are preferably those which are polyfunctional with respect to oxo compounds, particularly phenol, preferably $(C_1-C_{12})$-alkylphenols, aryl- or aralkylphenols such as cresols, 1,3,5-xylenols, isopropyl phenol, p-tert-butyl-phenol, amyl-phenols and octylphenol, diphenylolpropane, phenylphenol, cumylphenol and particularly nonylphenol, and products of the addition reaction of phenols and ethylenically unsaturated monomers such as α-methylstyrene, α-chlorostyrene, vinyltoluene or cyclopentadiene.

The alcohols E) are those which have at least two hydroxyl group such as glycols like ethylene glycol, trimethylolethane, trimethylolpropane, glycerol or pentaerythritol.

The basic compounds of divalent metals F) are preferably compounds of magnesium, zinc or more particularly calcium. The metal compounds can be employed alone or as mixtures. Preference is given to the oxides and hydroxides and the salts of weak acids such as the carbonates, bicarbonates, acetates and oxalates.

The novel process of the invention for the preparation of the novel resinates, the proportion of the individual components, based on the total amount of all reactive components, comprises reacting 50 to 95% by weight, preferably from 60 to 90% by weight, of rosins or rosin acids from substance group A), 1 to 20% by weight, preferably 3 to 10% by weight, more preferably 5 to 8% by weight, of aldehyde components from substance group B), and 0 to 5% by weight of α,β-olefinically unsaturated carboxylic acids or anhydrides thereof from substance group C) and reacting the resulting adduct with 1 to 30% by weight, preferably from 5 to 20% by weight, of phenolic components from substance group D), 0 to 10% by weight of alcohols containing at least two hydroxyl groups from substance group E) and then with 0.1 to 15% by weight, preferably from 4 to 8% by weight, of basic compounds of divalent metals from substance group F).

In the first reaction step, rosins or rosin acids A) are employed. The compounds A) can be modified during the first reaction step or in some cases beforehand by reaction with α,β-olefinically unsaturated carboxylic acids or anhydrides thereof C). Separate modification of rosins A) with α,β-olefinically unsaturated carboxylic acids C) is known. To this end, the compounds A) and C) are preferably reacted at from 140° to 160° C. in the melt of the reactants.

The reaction of A) and B) and optionally C) is carried out at an elevated temperature of, preferably, 80° to 200° C., more preferably 100° to 160° C., at a pressure of, preferably, 1 to 10 bar, more preferably 2 to 6 bar.

In the second reaction step, the adduction products of A) and B) and optionally C) formed in the first reaction step are heated with the phenols D), preferably without a solvent and at atmospheric pressure, to a temperature of, preferably, 200° to 300° C., more preferably 220° to 260° C., so that the condensation reaction can take place with elimination of water. If alcohols E) are also present as esterification agents, these can be added to the batch at the same time as the phenols D).

The third reaction step involves reaction with the divalent metal compound F) to give the actual resinate. To this end, the precursor formed from components A), B), D) and optionally C) and E) is reacted with basic compounds of divalent metals F) at a temperature of 160° to 300° C., preferably 200° to 260° C., with resinate formation and removal of the water of reaction by distillation. Subsequently, either the melt is diluted with toluene and the resinate obtained directly as a toluene solution or the reaction mixture is cooled to room temperature and the resinate is obtained as a solid resin.

A particularly preferred embodiment comprises preparing the salts of weak acids of divalent metals in situ during the reaction from the oxides or hydroxides of these metals by reaction with the corresponding weak acids. For example, calcium acetate, which reacts readily with rosin acids, can be prepared by reacting the hydroxide with acetic acid in the reaction melt.

The novel products can be prepared without difficulties by the above-described process steps and the reactions are carried out in a conventional reactor or glass flask equipped with a stirrer, a heating means, a thermostating means, a feed device, a reflux condenser and a distillation device. For example, rosin A) or a mixture of rosins which have been partially reacted with α,β-olefinically unsaturated carboxylic acids or anhydrides thereof C) are introduced into the reactor together with aldehyde B) and are reacted at a temperature of 140° C. so that a pressure of about 3 bar builds up in the closed vessel. This adduction reaction is usually complete after three hours.

The pressure in the reactor is then released and the appropriate phenol D) and optionally the alcohol E) are added, and the mixture is warmed to high reaction temperatures of about 250° C., so that the resultant water of reaction begins to distil off. The metal compound F), preferably a calcium compound, which is expediently in suspended form, for example in an inert solvent such as xylene, is then added at this temperature. If the metal compound F) is an acetate, it is possible to prepare this during the reaction from the oxide or hydroxide by addition of the requisite amount of acetic acid. The resinate formation is complete after about 4 to 6 hours, which is evident from the cessation of the elimination of water. Residual volatile constituents of the resin melt can be removed in vacuo.

Before the reaction is terminated, the completeness of the reaction is monitored by viscosity determinations if it is necessary to establish a predefined value range for product control. To this end, the resins of the invention are dissolved in toluene to give, for example, a 25% strength by weight solution, and the viscosity of the solutions is determined using a conventional rotational viscometer in accordance with DIN 53 214 or using a capillary viscometer in accordance with DIN 53 177.

The resin is initially obtained as a melt which can then be converted into large pieces, pellets or flakes by conventional methods during cooling. It is also possible to convert the resinate directly into a dissolved form by addition of toluene to the melt.

The resin solutions have a viscosity of, preferably, 2 to 100 mPa·s, more preferably 4 to 50 mPa·s, at 23° C., 25% strength by weight solution in toluene, but the mixtures can also be above or below this range. Further characterization can be achieved using the melting range. As desired, the resins of the invention have very high melting points, preferably in the range 150° to 180° C., measured in accordance with DIN 53 181 and 53 736. The products have an acid number which is preferably below 60 mg of KOH/g of resin, measured in accordance with DIN 53 402.

The novel resinates have superior properties to the resinates of the prior art.

The novel presence of phenols D) proves to be extraordinarily favorable for the resinate formation in the third step. Thus, very high degrees of reaction of the carboxyl groups with the metal compounds can be achieved without undesired crystallization which adversely affects the resin properties or even makes the resins totally unusable. As is known, high degrees of reaction are very important for good pigment wetting properties and for good drying of the intaglio printing ink. In addition, products prepared, particularly with nonylphenol, exhibit surprisingly reduced melt viscosity which is extremely advantageous in industrial-scale production.

No novel products are obtained when components A), B) and D) are reacted simultaneously with one another in a known manner in the presence of acidic or basic catalysts followed by resinate formation, since products having unsuitable properties are formed (Comparative Example 3).

The invention furthermore relates to the use of the resins according to the invention in printing inks, preferably as binders in printing inks for intaglio printing of illustrations. The novel resinates allow the formulation of low-resin inks, preferably yellow inks, but also particularly red inks. In spite of the low resin content, they give fast-drying inks of high gloss and high color density which exhibit a surprisingly low level of strike-through, even on natural paper. A further advantage is the excellent shelf life of the yellow and red inks prepared using the novel resinates.

In the following examples, there are described several preferred embodiments to illustrate the invention. However, it should be understood that the invention is not intended to be limited to the specific embodiments. Parts and percentages are by weight unless stated otherwise.

Example 1

Preparation of a novel solid resinate from rosin, formaldehyde, nonylphenol and calcium hydroxide 1,000 g of commercially available colophony of Chinese origin were melted under a nitrogen atmosphere in a heatable 2 liter multineck flask fitted with a stirrer, a thermometer, a dropping funnel, a reflux condenser and an inlet tube and then 100 g of paraformaldehyde were added to the melt, which was at 110° C. The flask was sealed and the contents were heated to 150° C. so that a pressure of 2 bar was established. After reaction for two hours, the flask was decompressed to atmospheric pressure and 60 g of nonylphenol were added to the reaction mixture. The melt was heated to 250° C. with removal of water by distillation and a suspension of 68 g of calcium hydroxide in 68 g of xylene was added dropwise to the melt over the course of one hour with removal of solvent and further water by distillation. 13 g of acetic acid in 5 g of xylene were added dropwise over the course of half an hour. The mixture was allowed to react for a further two hours, was evacuated to 50 mbar to remove volatile constituents, aerated with nitrogen to atmospheric pressure and allowed to cool. The solid resin melted at 140° C. and had a viscosity of 5.5 mPa·s as a 25% strength solution in toluene.

Comparative Example 1

Preparation of a solid resinate of low solution viscosity in accordance with DE-C 27 55 825 from rosin, formaldehyde and calcium hydroxide 1,000 g of commercially available colophony of Chinese origin were melted under a nitrogen atmosphere in a heatable 2 liter multineck flask fitted with a stirrer, a thermometer, a dropping funnel, a reflux condenser and an inlet tube. 100 g of paraformaldehyde were then added to the melt, which was at 110° C. The flask was sealed and the contents were heated to 150° C. so that a pressure of 2 bar became established. After reaction for two hours, the flask was decompressed to atmospheric pressure and the reaction mixture was heated to 250° C. A suspension of 68 g of calcium hydroxide in 68 g of xylene was added dropwise to the melt over the course of one hour with removal of solvent and water by distillation. 13 g of acetic acid in 5 g of xylene were then added dropwise over the course of half an hour. The mixture was allowed to react for a further two hours, was evacuated to 50 mbar to remove volatile constituents, aerated with nitrogen to atmospheric pressure and allowed to cool. The solid resin melted at 145° C. and had a viscosity of 2.5 mPa·s as a 25% strength solution in toluene.

Example 2

Preparation of a novel solid resinate from rosin, maleic anhydride, formaldehyde, nonylphenol and calcium hydroxide 1,000 g of commercially available colophony of Portuguese origin and 30 g of maleic anhydride were melted at 160° C. under a nitrogen atmosphere in a heatable 2 liter multineck flask fitted with a stirrer, a thermometer, a dropping funnel, a reflux condenser and an inlet tube and after one hour, the mixture was allowed to cool to 110° C. 90 g of paraformaldehyde were added to the melt and the flask was sealed. The contents were heated to 150° C. so that a pressure of 2 bar became established and after reaction for two hours, the flask was decompressed to atmospheric pressure. 60 g of nonylphenol were added to the reaction mixture, and the melt was heated to 250° C. with removal of water by distillation. A suspension of 68 g of calcium hydroxide in 68 g of xylene was added dropwise to this melt over the course of one hour with removal of solvent and further water by distillation. 13 g of acetic acid in 5 g of xylene were added dropwise over the course of half an hour. The mixture was allowed to react for a further two hours, was evacuated to 50 mbar to remove volatile constituents, aerated with nitrogen to atmospheric pressure and allowed to cool. The solid resin melted at 140° C. and had a viscosity of 4.5 mPa·s as a 25% strength solution in toluene.

Example 3

Preparation of a novel solid resinate from tall oil rosin, maleic anhydride, formaldehyde, nonylphenol and calcium hydroxide The procedure was as described in Example 2, but the colophony was replaced by the same amount of a tall oil rosin having an acid number of 165 g of KOH/g of rosin. The solid resin melted at 138° C. and had a viscosity of 4 mPa·s as a 25% strength solution in toluene.

Example 4

Preparation of a novel solid resinate from tall oil rosin, maleic anhydride, formaldehyde, glycerol, nonylphenol and calcium hydroxide The procedure was as described in Example 2, but the colophony was replaced by the same amount of a tall oil rosin having an acid number of 165 g of KOH/g of rosin and 10 g of glycerol were added to the batch. The solid resin melted at 145° C. and had a viscosity of 6.5 mPa·s as a 25% strength solution in toluene.

Comparative Example 2

An attempt to prepare a solvent resinate having increased solution viscosity in accordance with DE-C 27 55 825 from rosin and formaldehyde with an increase in the amount of calcium hydroxide employed was made. The procedure was as described in Comparative Example 1, but the amount of calcium hydroxide employed was increased by 15% from 68 g to 78.2 g. The resultant product contained crystallized constituents and did not dissolve fully in toluene. It was unusable for use as a binder in toluene intaglio printing inks.

Example 5

Preparation of a novel solid resinate of increased solution viscosity from rosin, formaldehyde and nonylphenol with an increased amount of calcium hydroxide employed The procedure was as described in Example 1, but the amount of calcium hydroxide employed was increased by 15% from 68 g to 78.2 g. The resultant resin contained no crystallized constituents and gave a clear solution in toluene. A 25% strength toluene solution had a viscosity of 27 mPa·s.

Comparative Example 3

Preparation of a solid resinate from rosin, formaldehyde, nonylphenol and calcium hydroxide 1,000 g of commercially available colophony were melted under a nitrogen atmosphere in a heatable 2 liter multineck flask fitted with a stirrer, a thermometer, a dropping funnel, a reflux condenser and an inlet tube and 100 g of paraformaldehyde, 60 g of nonylphenol and 5 g of calcium hydroxide were added to the melt which was at 110° C. The melt was heated to 140° C. in a sealed reactor so that a pressure of 2 bar became established. After reaction for two hours, the flask was decompressed to atmospheric pressure, and the melt was heated to 250° C. with removal of water by distillation. A suspension of 63 g of calcium hydroxide in 68 g of xylene was added dropwise to this melt over the course of one hour with removal of solvent and further water by distillation. 13 g of acetic acid in 5 g of xylene were then added dropwise over the course of half an hour. The mixture was allowed to react for a further two hours, was evacuated to 50 mbar to remove volatile constituents, aerated with nitrogen to atmospheric pressure and allowed to cool. The solid resin melted at 140° C. and a 25% strength solution in toluene had a gelatinous, viscous consistency. Formulation of a toluene intaglio printing ink was impossible.

Example 6

Ink A for toluene intaglio printing was prepared by conventional dispersion methods from 30 g of binder resin from Comparative Example 1, 8 g of the pigment ®Litholrubin (red pigment, manufacturer BASF AG) and 62 g of toluene.

Toluene intaglio printing inks were formulated analogously from 24 g of binder resin from Examples 1 and 2, 8 g of the pigment litholrubin and 68 g of toluene.

A low-resin ink B was obtained using the resinate from Example 1 and a low-resin ink C was obtained using the resinate from Example 2.

The inks were printed onto coated paper using a printing machine and the gloss was measured using a Lange bench reflectometer at an angle of incidence of 60°. To assess the strike-through behavior, ink films in a thickness of 24 μm were knife-coated onto natural paper. The strike-through of, the inks to the reverse of the printed material, which should be as low as possible for good print properties, was assessed visually by determining the relative color density of the reverse of the printed material compared with the front side on a score between 0 and 6.

0=no color density on the reverse

6=maximum color density on the reverse (identical with the front side)

| Ink | A | B | C |
|---|---|---|---|
| Gloss [%] | 55 | 54 | 57 |
| Strike-through | 1 | 1 | 1 |

The low-resin inks B and C, which had a resin content reduced by 25% by weight compared with ink A, had a similar print result as the ink containing the comparative resin in spite of the reduced resin content.

To determine the shelf life, the inks were then stored for 4 days in a heating cabinet at 50° C., and re-printed, and the gloss and strike-through behavior were determined as described above.

| Ink | A | B | C |
|---|---|---|---|
| Gloss [%] | 42 | 51 | 52 |
| Strike-through | 5 | 1 | 1 |

After storage, the drop in gloss and strike-through for the comparative ink were greater than in the inks containing the novel resins.

Example 7

Yellow ink D for toluene intaglio printing was prepared by conventional dispersion methods from 27 g of binder resin from Comparative Example 1, 8 g of ®Permanent Yellow DHG N 22 (yellow pigment, manufacturer Hoechst AG) and 65 g of toluene.

Yellow toluene intaglio printing inks were formulated analogously from 22 g of binder resin from Examples 1 and 2, 8 g of ®Permanent Yellow DHG N 22 and 70 g of toluene.

A low-resin ink E was obtained using the resinate from Example 1 and a low-resin ink F was obtained using the resinate from Example 2. The inks were printed as described above and assessed.

| Ink | D | E | F |
|---|---|---|---|
| Gloss [%] | 65 | 65 | 62 |
| Strike-through | 1 | 1 | 1 |

Low-resin inks E and F, which had a resin content reduced by about 18% by weight compared with ink D, had a similar print result as the ink containing the comparative resin in spite of the reduced resin content.

To determine the shelf life, the inks were stored for 4 days in a heating cabinet at 50° C., and re-printed, and the gloss and strike-through behavior were determined as described above.

| Ink | D | E | F |
|---|---|---|---|
| Gloss [%] | 59 | 60 | 58 |
| Strike-through | 1 | 1 | 1 |

Even after storage, the inks formulated with the novel resins exhibited a similarly good printing behavior as the ink formulated with the resin of the prior art, in spite of the lower resin content.

Example 8

A low-resin yellow toluene intaglio printing ink was formulated from 18 g of binder resin from Example 4, 8 g of Permanent Yellow DHG N 22 and 74 g of toluene and had excellent printing properties and gave prints with good gloss.

Various modifications of the resinates of the invention may be made without departing from the spirit or scope thereof and it is to be understood that the invention is intended to be limited only as defined in the appended claims.

What is claimed is:

1. A modified resinate prepared by reacting
   A) rosins or rosin acids with
   B) aldehyde components and optionally
   C) $\alpha,\beta$-olefinically unsaturated carboxylic acids or anhydrides thereof, subsequently reacting the resultant adduction products with
   D) phenols and optionally
   E) alcohols containing at least two hydroxyl groups and subsequently forming resinates with
   F) basic compounds of divalent metals.

2. A modified resinate of claim 1 wherein the basic compounds of divalent metals F) are compounds of magnesium, calcium and zinc.

3. A modified resinate of claim 1 wherein compound A) is a rosin, compound B) is formaldehyde, compound D) is nonylphenol and compound F) is a calcium compound.

4. A modified resinate of claim 1 wherein compound F) is calcium hydroxide or calcium oxide.

5. A modified resinate of claim 1 wherein the viscosity of 25% strength by weight solutions of the resinates in toluene is from 4 to 50 mPa·s.

6. A modified resinate prepared by reacting
   A) 50 to 95% by weight of rosin or rosin acids
   B) 1 to 20% by weight of aldehyde components
   C) 0 to 5% by weight of $\alpha,\beta$-olefinically unsaturated carboxylic acids or their anhydrides and reacting the resulting adduct with
   D) 1 to 30% by weight of phenols and
   E) 0 to 10% by weight of alcohols having at least two hydroxy groups and reacting the resulting product with
   F) a basic compound of divalent metal.

7. A process for the preparation of a modified resinate of claim 1 by reacting 50 to 95% by weight of rosins or rosin acids
   A) with 1 to 20% by weight of aldehyde components B) and 0 to 5% by weight of $\alpha,\beta$-olefinically unsaturated carboxylic acids or anhydrides thereof C) at an elevated temperature of 80° to 200° C. and at a pressure of 1 to 10 bar, then reacting the resultant adducts with 1 to 30% by weight of phenol D) and 0 to 10% by weight of alcohols containing at least two hydroxyl groups E) in the temperature range from of 200° to 300° C. and then forming resinates with 0.1 to 15% by weight of basic compounds of divalent metals F) at a temperature of 160° to 300° C.

* * * * *